United States Patent [19]

Saito

[11] Patent Number: 5,486,960
[45] Date of Patent: Jan. 23, 1996

[54] DISK STORAGE DEVICE WITH ELECTROSTATICALLY BONDED INFORMATION STORAGE DISK

[75] Inventor: Shigemasa Saito, Kanagawa, Japan

[73] Assignee: Fuji Electric Co., Ltd., Japan

[21] Appl. No.: 301,460

[22] Filed: Sep. 7, 1994

[30] Foreign Application Priority Data

Sep. 9, 1993 [JP] Japan .................................. 5-223761

[51] Int. Cl.⁶ .................................................. G11B 17/02
[52] U.S. Cl. ...................... 360/99.08; 360/99.04; 360/98.07
[58] Field of Search ............................ 360/99.08, 98.07, 360/99.04; 369/270, 271

[56] References Cited

U.S. PATENT DOCUMENTS

| | | | |
|---|---|---|---|
| 4,802,158 | 1/1989 | Ogusu | 369/270 |
| 5,050,158 | 9/1991 | Kitada et al. | 360/99.04 X |
| 5,115,366 | 5/1992 | Oishi | 360/99.04 X |
| 5,301,183 | 4/1994 | Minoda et al. | 369/271 X |
| 5,323,076 | 6/1994 | Hajec | 310/90 |

*Primary Examiner*—John H. Wolff
*Attorney, Agent, or Firm*—Parkhurst, Wendel & Rossi

[57] ABSTRACT

A disk storage device includes a fixed information storage disk that is free from deformation, has a wide effective data storage area and shows excellent anti-mechanical shock properties. Specifically, a disk hole of the information storage disk is fit to a hub coupled to a rotary shaft of a spindle motor until the disk contacts with a flange face of the hub. The spindle motor and the disk are then sandwiched by a lower electrode which contacts with the bottom surface of the spindle motor and an upper electrode which contacts with the upper surface of the disk. A DC power supply applies positive potential to the hub via the lower electrode and the casing of the spindle motor and negative potential to the disk via the upper electrode. An electrostatic junction portion is formed between the bottom face of the disk and the flange face of the hub, thereby securing the disk tightly to the hub.

14 Claims, 3 Drawing Sheets

DISK STORAGE DEVICE WITH ELECTROSTATICALLY BONDED INFORMATION STORAGE DISK

FIELD OF THE INVENTION

The present invention relates to a disk storage device, and more specifically, to a disk storage device in which an information storage disk is electrostatically bonded to the spindle motor of the disk storage device.

BACKGROUND

A conventional magnetic disk 4 is fixed to a spindle motor 1, as shown in FIG. 4(a), by fitting a disk hole 5 of the magnetic disk 4 to a hub 3 coupled to the rotary shaft of the spindle motor 1, holding the magnetic disk 4 from the upper side with a circular disk clamp 6 made of metal such as stainless steel, and screwing down a screw bolt 7 to depress the magnetic disk 4 onto a flange face 2 of the rotary shaft. The disk clamp 6 has a curved peripheral portion 6a which works as a plate spring. The curved peripheral portion 6a elastically depresses the portion of the magnetic disk 4 surrounding the disk hole 5 to fix the magnetic disk 4 vertically. The magnetic disk 4 is also fixed horizontally by the friction between the disk 4 and the flange face 2 corresponding to the depressing force.

The fixing method described above, which uses the disk clamp 6 and screw bolt 7, requires tremendous depressing force to obtain a sufficient frictional force to securely fix the magnetic disk in its radial and circumferential directions. Since the peripheral area of the disk 4 surrounding the disk hole 5 (herein after referred to as clamped area) is strongly clamped by the flange face 2 and the curved peripheral portion 6a of the disk clamp 6 as shown in FIG. 4(b), strain deformation spreads to an adjacent area around the clamped area to form a deformed area. The deformed area causes an output difference between a pair of magnetic heads (not shown), facing opposed to one another, through the magnetic disk 4. The deformed area does not cause a serious problem in the disk storage device for a disk having a diameter of 3.5 inches or more in which the data storage area is separated from the clamped area. However, it is impossible to store and readout data in and from the deformed area in the disk storage device for a disk having a diameter of 2.5 inches or less in which the clamped area extends near to the data storage area.

Using a weaker depressing force may eliminate the deformed area. A weaker depressing force, however, causes deterioration of the disk's anti-mechanical-shock property since the weaker depressing force reduces the friction on the disk plane and allows the magnetic disk to displace horizontally.

To solve the above described problem, a disk storage device as shown in FIG. 5(a) is proposed in the Japanese Patent Application No. H04-178715. In the proposed disk storage device of FIG. 5(a), the magnetic disk 4 is fixed to the spindle motor 1 by fitting the disk hole 5 of magnetic disk 4 to the hub 3 coupled to the rotary shaft of the spindle motor 1, fitting an elastic member 8 with high coefficient of friction around the hub 3 and onto the fitted magnetic disk 4, holding the magnetic disk 4 and the elastic member 8 from the upper side with a circular disk clamp 9 made of metal such as stainless steel, and screwing down a screw bolt 7 to depress the magnetic disk 4 onto a flange face 2. The elastic member 8 facilitates attempting fixing the magnetic disk 4 without causing any deformed area as shown in FIG. 5(b), since the elastic member 8 depresses the magnetic disk 4 to fix the magnetic disk 4 elastically and uniformly and increases the frictional force. However, a deformed area of a small diameter is still formed around the clamped area, for example of 1.89 inches or less, since a depressing force is exerted to the magnetic disk even when the elastic member 8 is installed. Especially when a thin base plate of the magnetic disk of small diameter is made of aluminum alloy, glass or ceramics, the deformed area is caused so often that reduction of the data storage area can no longer be ignored.

In view of the foregoing, an object of the present invention is to provide a disk storage device in which a magnetic disk is fixed in a manner that is free from deformation, secures a wide effective data storage area and shows excellent anti-mechanical shock property.

SUMMARY OF THE INVENTION

The present invention provides a disk storage device that includes a magnetic disk including a disk hole that is fixed to a rotary shaft or hub of a spindle motor by an electrostatically bonded fixing portion. The electrostatic fixing portion is preferably comprised of at least one of a portion of a major face of the magnetic disk surrounding the disk hole and a flange face of the hub, a side face of the magnetic disk forming the disk hole and a circumferential surface of the hub, and a side face of the magnetic disk forming the disk hole and a circumferential surface of the rotary shaft.

The base plate of the magnetic disk is preferably made of glass or ceramics when the hub is made of aluminum alloy for facilitating the formation of an electrostatic junction between the magnetic disk and the hub. When the hub is not used, the base plate of the magnetic disk is preferably made of glass or ceramics when the rotary shaft is made of a stainless alloy, or the base plate of the magnetic disk is preferably made of an aluminum alloy when the rotary shaft is made of a Fe—Ni alloy for facilitating electrostatic junction between the magnetic disk and the rotary shaft of the spindle motor.

In the disk storage device, which includes the fixing portion (hereinafter referred to as electrostatic junction portion) in which the magnetic disk is tightly fixed to the rotary shaft of the spindle motor or the hub coupled to the rotary shaft, the fixed magnetic disk provides a wide effective data storage area without the deformed area associated with the prior art, since the magnetic disk is fixed to the rotary shaft or to the hub without applying a depressing force between them. The disk storage device of the present invention eliminates the clamping and elastic members of the prior art and therefore reduces costs by reducing the number of constituent parts required.

BRIEF DESCRIPTION OF THE DRAWINGS

The present invention will be described in detail hereinafter with reference to the accompanying drawings which illustrate preferred embodiments of the present invention, wherein:

FIG. 5 is a sectional view showing a fixing structure for a related art disk storage device and FIG. 4(b) is a sectional view of a magnetic disk fixed by the method of the related art.

DETAILED DESCRIPTION OF PREFERRED EMBODIMENTS

Figure 1A:
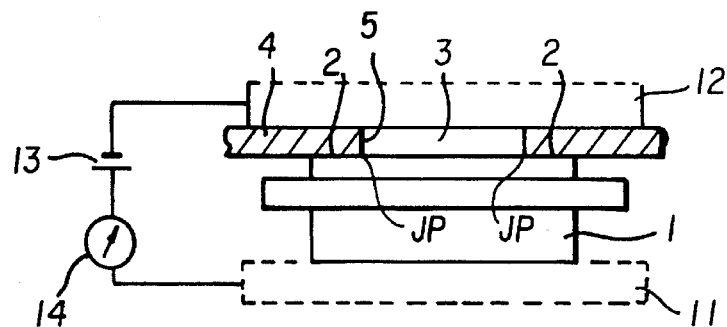
FIG. 1(a) is a sectional view showing a first embodiment of a fixing structure for a disk storage device according to the present invention.

FIG. 1(a) is a sectional view showing a first embodiment of a fixing structure for the disk storage device according to the present invention. In FIG. 1(a), a disk hole 5 of a magnetic disk 4 is fitted to a hub 3 coupled to a rotary shaft of a spindle motor 1 until the magnetic disk 4 contacts with a flange face 2. The spindle motor and the magnetic disk 4 fitted to the spindle motor 1 are sandwiched by a lower electrode 11 that contacts the bottom surface of the spindle motor 1 and an upper electrode 12 that contacts the upper surface of the magnetic disk 4. A DC power supply 13 applies a positive potential to the hub 3 via the lower electrode 11 and the casing of the spindle motor 1, and a negative potential to the magnetic disk 4 via the upper electrode 12. By this process, an electrostatic junction portion (JP) is formed between the bottom face of the magnetic disk 4 and the flange face 2 and the magnetic disk 4 is fixed tightly to the hub 3. The bonding strength of the thus formed junction portion is so strong as to break the magnetic disk 4 if one tries to separate the once bonded disk from the hub 3. In this embodiment, the base plate of the magnetic disk 4 is made of glass which contains alkali and alkaline earth ions (K ions, Na ions, Ca ions, etc.) as impurities. The hub is made of an aluminum alloy. The facing surfaces of the magnetic disk 4 and the hub 3 are polished to a surface roughness of about 0.1 μm. The electrostatic bonding between the magnetic disk 4 and the flange face 2 of the hub 3 is accomplished by applying positive potential to the hub 3 and negative potential to the magnetic disk 4 with the DC power supply of about 1000 V after heating the magnetic disk 4 and the hub 3 up to 120° C.

Observation by an ammeter 14 has indicated that the most current flows in an early stage of voltage application and the current decreases and finally stops flowing in several minutes. No foreign materials were found by microscopic observation in the junction portion between the magnetic disk 4 and the flange face 2. Observations of the junction under a scanning electron microscope and an X-ray micro-analyzer have confirmed that Na+ ions migrated into the glass base plate several μm deep from the boundary surface. These observations indicate that the electrostatic bonding causes very little stress and that the magnetic disk 4 (glass) and the hub 3 are joined to each other by covalent bonding between the metal oxides in the hub 3 and oxygen in the magnetic disk 4 (glass) left behind by the above described alkali ion migration.

The mechanism of the electrostatic junction may be estimated as follows. Mobility of the Na+ ion in the glass becomes high at high temperature of around 120° C. The Na+ ion migrates deep into the glass (depolarization) when high voltage is applied at high temperature and a space-charge layer is formed on the side of the boundary surface of the glass which attracts by electrostatic attraction the boundary surface of the magnetic disk 4. The boundary surfaces of the magnetic disk 4 and the hub 3 temporarily join to each other through hydrogen bond (OH), since an aluminum oxide ($Al_2O_3$) is formed on the boundary surface of the hub 3 and a silicon oxide remains on the boundary surface of the magnetic disk 4 from which the Na+ ion has been expelled. The hydrogen bonding portion once formed is dehydrated by high electric field and heat, and the boundary surfaces of the magnetic disk and the hub 3 are bonded tightly with each other through covalent bond of oxygen such as Al—O—Si. In this embodiment, the mobility of the Na+ ion is increased previously to lower the resistance of the glass because there exists limitation in applying high voltage.

By employing the above-described fixing structure for the magnetic disk 4, the deformed area is completely eliminated from the magnetic disk 4, since the fixing structure, comprised of the electrostatic junction portion from which foreign materials are eliminated, bonds the magnetic disk 4 and the hub 3 with each other without application of a depressing force. Therefore, the fixing structure is well suited for thin magnetic disks having a small diameter and for efficiently securing a wide data storage area on the magnetic disk.

Figure 1B:
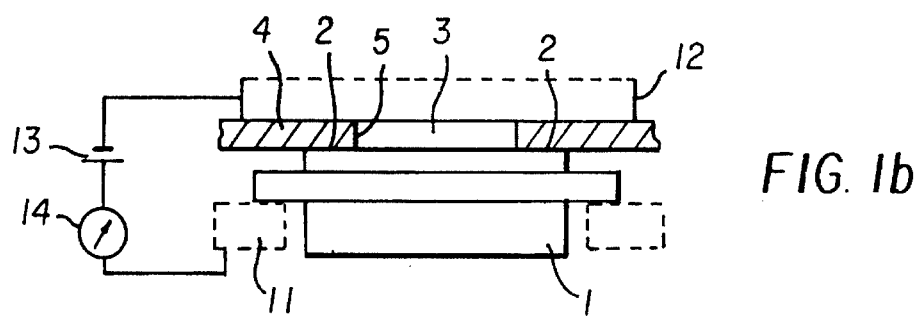
FIG. 1(b) is a sectional view showing another setup for electrostatic bonding in the first embodiment.

FIG. 1(b) is a sectional view showing another setup for electrostatic bonding of the first embodiment. In FIG. 1(b), the lower electrode 11 is made to contact directly with bottom surface of the hub 3 to be biased to a positive potential. This voltage application method is as effective as the above described voltage application method for bonding the bottom face of the magnetic disk 4 and flange face 2 of the hub 3 with each other.

Figure 2A:
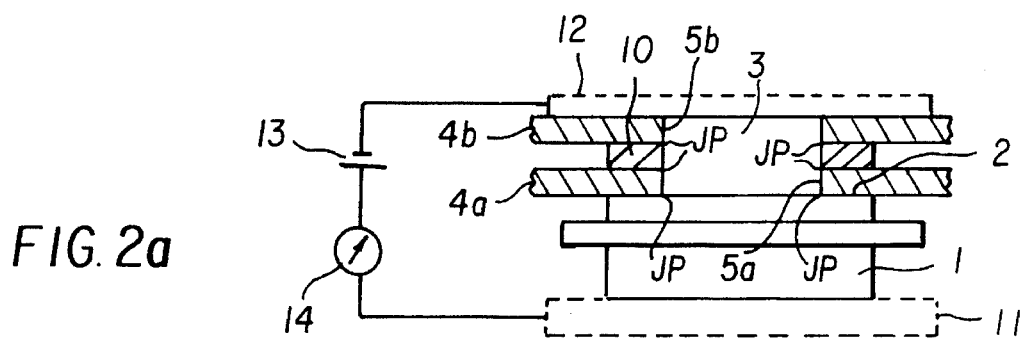
FIG. 2(a) is a sectional view showing a second embodiment of a fixing structure for a disk storage device according to the present invention with two magnetic disks.

FIG. 2(a) is a sectional view showing a second embodiment of a fixing structure for the disk storage device according to the present invention. In FIG. 2(a), the disk hole 5a of the first magnetic disk 4a is fitted to the hub 3 coupled to the rotary shaft of the spindle motor 1 until the first disk 4a contacts with the flange face 2. A spacer ring 10 is then fitted to the hub 3, and then a disk hole 5b of a second magnetic disk 4b is fitted to the hub 3 until the second disk 4b contacts with the spacer ring 10. The spindle motor 1 and the magnetic disks 4a, 4b sandwiching the spacer ring 10 between them are sandwiched by a lower electrode 11 that contacts with the bottom surface of the spindle motor 1 and an upper electrode 12 that contacts with the upper surface of the second magnetic disk 4b. A DC power supply 13 applies positive potential to the hub 3 and negative potential to the second disk 4b via the upper electrode 12. By this process, electrostatic junction portions (JP) are formed between the bottom face of the first disk 4a and the flange face 2, between the upper face of the first disk 4a and lower face of the spacer ring 10, and the upper face of the spacer ring 10 and the lower face of the second disk 4b. Thus the magnetic disks 4a, 4b are fixed tightly to the hub 3. The spacer ring 10 is made of Al alloy.

Figure 2B:
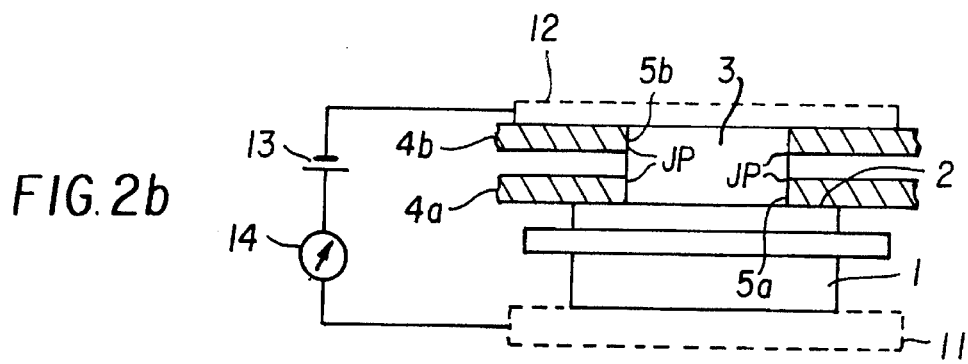
FIG. 2(b) shows a variation of the structure shown in FIG. 2(a)

The junction portions of FIG. 2(b) include the disk surfaces surrounding the disk holes 5a, 5b of the first and second disks 4a, 4b. It is also possible to electrostatically bond the side faces of the disk holes 5a, 5b with the circumferential surface of the hub 3. To accomplish this, it is preferable to finish the side faces of the disk holes 5a, 5b and the circumferential face of the hub 3 to the surface roughness of about 0.1 μm. Fit tolerance between the side faces of the disk holes 5a, 5b and the circumferential face of the hub 3 should be set to a state of tight fitting, since the electrostatic bonding is applied at 120° C. The fixing of disk, by forming junction portions between the side faces of the disk holes 5a, 5b and the circumferential surface of the hub 3, eliminates the spacer ring 10 and facilitates securing a wider data storage area. Forming junction portions between side faces can also be utilized in devices utilizing only a single magnetic disk.

Figure 3:
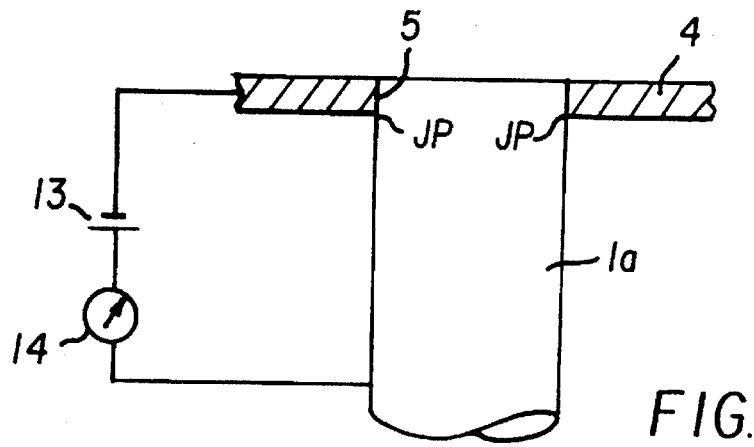
FIG. 3 is a sectional view showing a third embodiment of a fixing structure for a disk storage device according to the present invention.
Figure 4A:
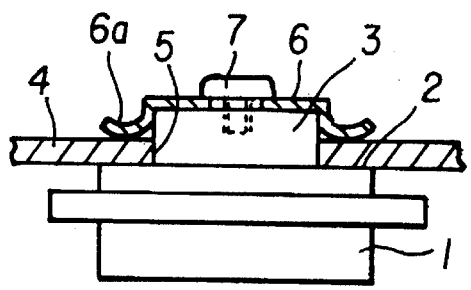
FIG. 4(a) is a sectional view showing a fixing structure for a disk storage device according to the prior art.
Figure 4B:
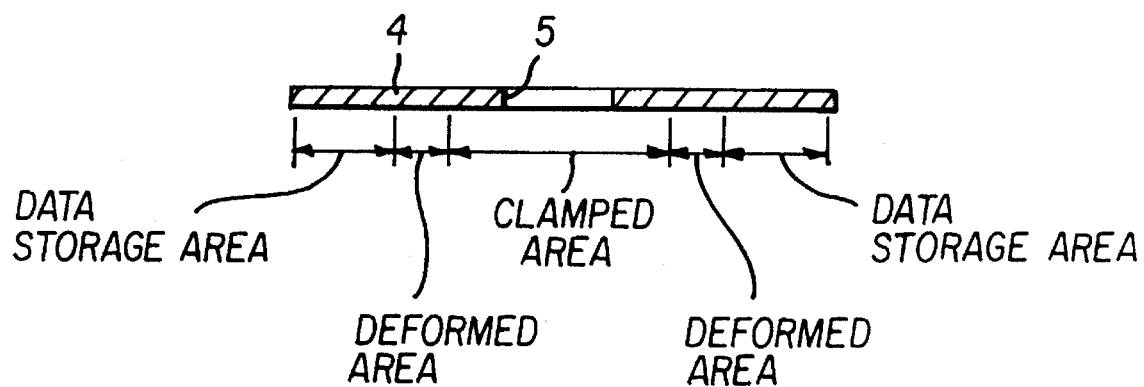
FIG. 4(b) is a sectional view of a magnetic disk fixed by the prior art.
Figure 5A:
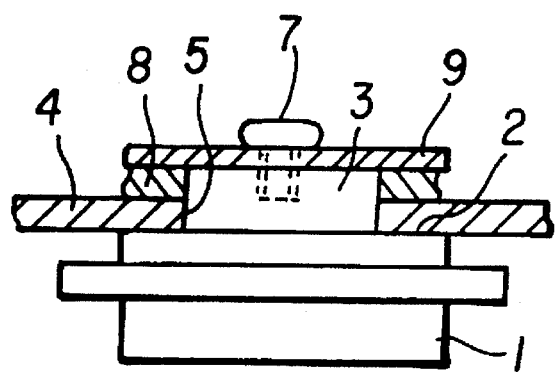
Figure 5B:
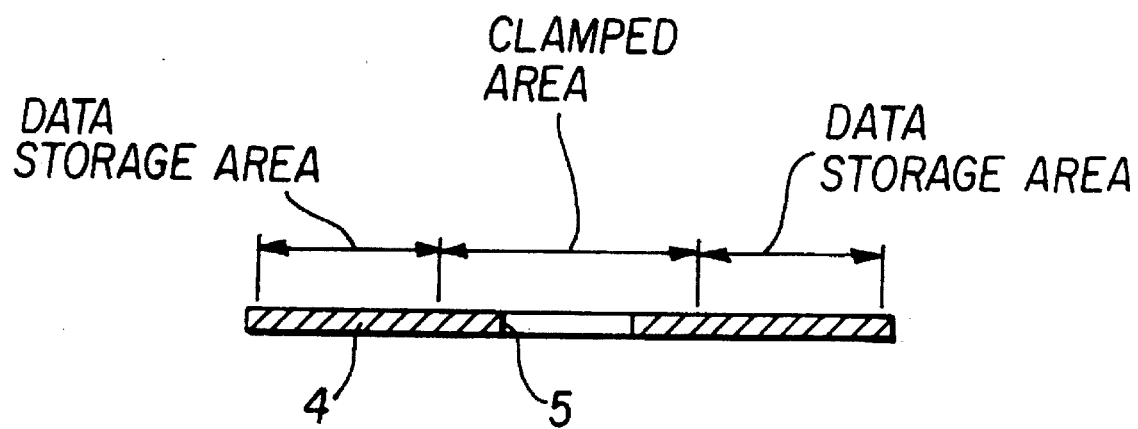

FIG. 3 is a sectional view showing the third embodiment of the fixing structure for the disk storage device according to the present invention. In FIG. 3, the disk hole 5 of the magnetic disk 4 is fitted to the rotary shaft 1a of the spindle motor 1. The DC power supply 13 applies positive potential to the rotary shaft 1a and negative potential to the magnetic disk 4. By this process, an electrostatic junction portion (JP) is formed between the side face of the disk hole 5 and the circumferential surface of the rotary shaft 1a. In this embodiment, the rotary shaft 1a of the spindle motor 1 is made of a stainless alloy or a Ne—Ni alloy. It is preferable to finish the side face of the disk holes 5 and the circumferential surface of the rotary shaft 1a to surface roughness of about 0.1 μm. Fit tolerance between the side faces of the disk hole 5 and the circumferential surface of the rotary shaft 1a should be set to a state of tight fitting.

The electrostatic bonding between the magnetic disk 4 and the rotary shaft 1a is accomplished by applying a positive potential to the rotary shaft 1a and negative potential to the magnetic disk 4 with the DC power supply of about 500 V after heating the magnetic disk 4 and fitting the magnetic disk 4 to the rotary shaft 1a heated up to 120° C. The ammeter 14 has indicated that the most current flows in an early stage of voltage application and the current decreases until it stops flowing in several minutes and that the junction portion was formed on the facing surface between the side face of the disk hole 5 and the circumferential surface of the rotary shaft 1a. For fixing a plurality of magnetic disks to the rotary shaft 1a, two processes may be used: fixing the magnetic disks one by one; and fitting the magnetic disks all at once to the rotary shaft 1a and applying voltage to all the disks at once.

When the base plate of the magnetic disk 4 is made of glass (for example Pyrex glass), electrostatic bonding proceeds as the alkali ions in the glass of the magnetic disk 4 migrate deeply from the boundary surface of the glass base plate by applied voltage. When the base plate of the magnetic disk 4 is made of Al alloy and the rotary shaft 1a is coated with a glass layer or a ceramics layer which contain alkali ions, the magnetic disk 4 is bonded to the rotary shaft 1a as the alkali ions migrate from the boundary surface of the glass layer or the ceramics layer deep into the layer by biassing the magnetic disk 4 to positive potential and the rotary shaft 1a to negative potential.

In the embodiments described above, the base plate of the magnetic disk is made of glass which contains alkali and alkaline earth ions (inevitable impurities such as Na ions, K ions, Ca ions, etc.). The base plate of the magnetic disk may be made of alkali ion containing ceramics made of $Al_2O_3$ to which $ZrO_2$ and $Y_2O_3$ are doped. Table 1 list combinations of the materials of the base plate of the magnetic disk and those of the hub or the rotary shaft including preferable combinations other than those disclosed above.

TABLE 1

| Magnetic disk (base plate) | Hub or Rotary shaft |
|---|---|
| Glass | Al, Ni, Cu, Mo, Ti |
| Ceramics | Al, Ni, Cu, Mo, Ti |
| Al, Ti, C | Metal coated with glass |
| Base plate coated with Ni-P plated layer | Metal coated with ceramics |

The fixing structure according to the present invention is applicable to fixing of disk storage media in general as well as to the hard disk drives.

The disk storage device according to the present invention, which is comprised of an electrostatic junction portion in which the magnetic is electrostatically bonded to the rotary shaft of the spindle motor, includes the following advantages.

(1) A wide effective data storage area is obtained without causing a deformed area even in a thin magnetic disk of a small diameter since the magnetic disk is fixed to the rotary shaft or the hub in a state that a depressing force is not exerted to the magnetic disk. The strong bonding force of the electrostatic junction provides excellent anti-shock property. The electrostatic bonding eliminates a clamping member and the like and contributes to reducing the cost of the device by reduction of number of the constituent parts.

(2) The electrostatic junction portion may be comprised of the inner major surface surrounding the disk hole and the flange face or of the side face of the disk hole and the circumferential surface of the hub when the hub is incorporated. The junction portion comprised of the side face of the disk hole and the circumferential surface of the hub is effective for securing a wide data storage area since a clamp area is not caused on the major disk surface.

(3) The electrostatic junction portion may be comprised of the side face of the disk hole and the circumferential surface of the rotary shaft of the spindle motor when the hub is not incorporated. This electrostatic junction portion efficiently secures a wide data storage area, eliminates the hub and contributes to further cost savings.

The invention has been described with reference to certain preferred embodiments thereof. It will be understood, however, that modifications and variations are possible within the scope of the appended claims. For example, although the invention was described with reference to a disk storage device including a magnetic storage disk, the invention is applicable to any type of information storage disk.

What is claimed is:

1. A disk storage device including: a spindle motor; a hub rotatably coupled to the spindle motor; and a magnetic information storage disk including a disk hole fixed to the hub by an electrostatically bonded fixing portion that forms a permanent physical bond between the disk hole and the hub.

2. The disk storage device as claimed in claim 1, wherein said fixing portion comprises a portion of a major face of said information storage disk surrounding said disk hole and a flange face of said hub.

3. The disk storage device as claimed in claim 2, wherein a base plate of said information storage disk comprises glass and said hub comprises an aluminum alloy.

4. The disk storage device as claimed in claim 2, wherein a base plate of said information storage disk comprises a ceramic material and said hub comprises an aluminum alloy.

5. The disk storage device as claimed in claim 1, wherein said fixing portion comprises a side face of said information storage disk forming said disk hole and a circumferential surface of said hub.

6. The disk storage device as claimed in claim 5, wherein a base plate of said information storage disk comprises glass and said hub comprises an aluminum alloy.

7. The disk storage device as claimed in claim 5, wherein a base plate of said information storage disk comprises a ceramic material and said hub comprises an aluminum alloy.

8. A disk storage device including: a spindle motor including a rotary shaft; and a magnetic information storage disk including a disk hole fixed to the rotary shaft by an electrostatically bonded fixing portion that forms a permanent physical bond between the disk hole and the hub.

9. The disk storage device as claimed in claim 8, wherein said fixing portion comprises a side face of said information storage forming said disk hole and a circumferential surface of said rotary shaft.

10. The disk storage device as claimed in claim 9, wherein a base plate of said information storage disk comprises glass and said rotary shaft comprises a stainless alloy.

11. The disk storage device as claimed in claim 9, wherein a base plate of said information storage disk comprises a ceramic material and said rotary shaft comprises a stainless alloy.

12. The disk storage device as claimed in claim 8, wherein a base plate of said information storage disk comprises glass and said rotary shaft comprises a Ni—Fe alloy.

13. The disk storage device as claimed in claim 8, wherein a base plate of said information storage disk comprises a ceramic material and said rotary shaft comprises a Ni—Fe alloy.

14. The disk storage device as claimed in claim 8, wherein a base plate of said information storage disk comprises an aluminum alloy and said rotary shaft comprises a Ni—Fe alloy.

* * * * *